United States Patent

[11] 3,615,211

| [72] | Inventor | James E. Lewis<br>Houston, Tex. |
|---|---|---|
| [21] | Appl. No. | 697,461 |
| [22] | Filed | Jan. 12, 1968 |
| [45] | Patented | Oct. 26, 1971 |
| [73] | Assignee | Ashland Oil, Inc.<br>Houston, Ky. |

[54] METHOD AND APPARATUS FOR MANUFACTURE OF CARBON BLACK
11 Claims, 3 Drawing Figs.

| [52] | U.S. Cl. | 23/209.4, 23/259.5 |
|---|---|---|
| [51] | Int. Cl. | C09c 1/50 |
| [50] | Field of Search | 23/209.4, 209.6, 259.5 |

[56] References Cited
UNITED STATES PATENTS

| 2,971,822 | 2/1961 | Williams | 23/209.4 |
|---|---|---|---|
| 3,307,911 | 3/1967 | Krejci | 23/209.4 |
| 3,401,020 | 9/1968 | Kester et al. | 23/209.4 |
| 3,408,165 | 10/1968 | Hinson | 23/209.4 |

*Primary Examiner*—Edward J. Meros
*Attorney*—Walter H. Schneider

ABSTRACT: A method and apparatus for producing carbon black from hydrocarbons in which a hydrocarbon feed stock, such as a liquid hydrocarbon oil, is converted to carbon black in a tunnel-type carbon black furnace, having a combustion zone whose diameter is greater than its axial length, a reaction zone whose diameter is substantially smaller than that of the combustion zone and which is substantially longer in axial length than the combustion zone and a restricted diameter choke, whose diameter is substantially smaller than the diameter of the reaction zone, between the combustion zone and the reaction zone, by burning a combustible mixture, such as a mixture of air and natural gas, in the combustion zone; mixing the flue gases from the burning of the combustible mixture with the feed stock to heat the feed stock prior to its passage through the restricted diameter choke and into the reaction zone; and injecting a quenching fluid, such as low-pressure steam, into the reaction zone, in progressively larger volumes, from the influent end to the effluent end of the reaction zone, including the introduction of a quantity of the quench fluid in the area of the reaction zone adjacent the juncture between the restricted diameter choke and the walls of the reaction zone itself, for example, by introducing the quench fluid at a plurality of points spaced from the juncture of the choke and the walls of the reaction zone to a point in the reaction zone at which the reaction mixture is generally quenched in accordance with the prior art. It is also contemplated that the angle which the injected quench fluid forms with the walls of the reaction zone should progressively increase from the influent to the effluent end of the reaction zone to form an annular veil of quench fluid defining a general cone shape with its base adjacent the influent end and its apex toward the effluent end.

INVENTOR
JAMES E. LEWIS

BY *Walter F. Schneider*

ATTORNEY

METHOD AND APPARATUS FOR MANUFACTURE OF CARBON BLACK

FIELD OF THE INVENTION

This invention relates to carbon black manufacture. More particularly, it relates to a method and an apparatus for producing carbon black by thermal decomposition of hydrocarbons.

SUMMARY OF THE PRIOR ART

At the present time, most carbon blacks of commerce are produced by a very few processes and these blacks may be grouped into classes, depending upon the types of rubber compositions and the vulcanized rubber which carbon blacks will produce. For example, a soft carbon black, as compared to a hard carbon black, is one which, when mixed with a conventional rubber compound and after vulcanization, yields a rubber which is softer, more resilient, more rubbery, and yet tough; whereas, a hard carbon black in the same compounds imparts stiffer, tougher characteristics, with lower resilience in the vulcanized rubber.

These two types of carbon black may, in essence, be considered to be the limits between which the vast majority of the other carbon blacks will fall, depending upon their hardness properties.

Commercial "channel" processes produce a hard-type carbon black which is especially good for automotive tire tread stocks, since it will withstand abrasion and have good physical test properties. However, the yield of carbon black from the channel process is only about 3.5 percent of the carbon content of the feed stock from which it is made. On the other hand, the "furnace" process produces a much higher yield of carbon black than the channel process but in many cases the product is of the softer type and less desirable for tire tread stocks. However, the furnace-type blacks have been improved substantially in recent years so that the high yields are still retained while producing hard carbon blacks having properties quite similar to, and, in some cases, superior to those produced by the channel process. It is this latter furnace-type process to which the present invention is directed.

In general, the furnace process comprises decomposing hydrocarbons by heat generated by burning a portion of the hydrocarbon feed stock itself and/or by the substantially complete combustion of a second, and generally different, hydrocarbon. The hydrocarbon feed stock employed, the method of injecting the reactants into the reactor, the reaction temperature, reaction time, peripheral velocity and turbulence of the reaction mass in the reaction chamber, ratio of refractory surface to reaction chamber volume, among other things, are all variables which determine the grade of the carbon black, as well as the quality of a particular grade. Since the reactants and the reaction themselves have, to a great extent, limited possibilities of improvement, a great deal of recent research, which has led to many modifications and improvements of the furnace process, has dealt with the reaction equipment itself and its utilization.

One such system, which has been developed for the production of improved carbon black by the furnace process, is what is known as the "tunnel-type" or "tube-type" reactor. In this reactor system, two cylindrical sections, one short section of large diameter, referred to generally as the "combustion section" and an elongated section of considerably smaller diameter, generally referred to as the "reaction zone" are provided. In a highly effective form of this particular type of reactor, the combustion section and the reaction section are additionally divided by a choke or zone of restricted diameter which is still smaller than the diameter of the reaction zone. In a reaction system of this type, hydrocarbons, comprising a liquid or gaseous material, and generally referred to as the "feed stock," is passed into the combustion section and thence into the reaction section of the furnace. As inflammable mixture of a combustion-supporting gas and fuel gas or fuel oil, which forms a "combustible mixture" is also introduced into the combustion section, at various angles and/or in various flow patterns, and this mixture is burned to form hot combustion or flue gases before it comes into contact with any substantial volume of the hydrocarbon feed stock at the axis of the combustion chamber. The combustion gases generally include such gases as result from the chemical reaction of a fuel gas, such as natural gas, and a combustion-supporting gas, such as air. The combustion gases and the feed stock then pass through the reaction zone and the feed stock is progressively converted or decomposed to form carbon black as it passes from entrance end of the reaction zone or tunnel to the exit end. At such time as maximum or optimum conversion to carbon black has occurred, the reaction product is generally quenched or cooled rapidly by a quench fluid, such as water, steam or the like, which is sprayed tangentially into the downstream end of the reaction zone. Upon issuing from the reactor, the quenched, gaseous effluent carrying the carbon black is further cooled and the carbon black is separated therefrom by any one of a variety of means, such as running the effluent through bags to screen out the carbon black, or running the effluent through electrical precipitators and/or cyclone separators.

While the above-described apparatus and technique have proved effective in the preparation of high quality furnace blacks, there are nevertheless certain limitations to this method and apparatus. For example, the product carbon black of a single grade is actually a blend formed by the very nature of the reaction and the equipment employed in the reaction. Within this blend, characterized by the reaction and the reactor, there is a rather wide variation of properties of the individual carbon black particles. In short, the resultant properties of the carbon black are actually the average properties of a comparatively wide variety of carbon blacks. In addition, the nature of the reaction and the reactor require the use of high-temperature refractory liners along the inner walls of the reactor and frequent replacement of these refractory linings. It is well known to one skilled in the art of carbon black manufacture that such degradation of the refractory lining of a reactor is generally a localized situation due to uneven heating or hot spots and thermal shock. Another disadvantage of present-day processes and equipment is the relative inability to quickly switch from the production of one grade of carbon black to another in the same furnace system. Yet another disadvantage, which is at least indirectly related to the utilization of refractory linings in the reactor, is the fact that once the reactor is shut down, it requires a substantial amount of time to heat up and stabilize the reactor for further production of carbon black.

SUMMARY OF THE INVENTION

It is therefore an object of the present invention to provide an improved process and apparatus for the production of carbon black which substantially overcomes the previously mentioned disadvantages of the prior art. Another object of the present invention is to provide an improved process and apparatus for the production of carbon black by the furnace process. Yet another object of the present invention is to provide an improved method and apparatus for the production of carbon black in a tunnel-type reactor. A still further object of the present invention is to provide an improved process and apparatus for the production of carbon black in a tunnel-type reactor having its combustion zone and the reaction zone separated by a restricted-diameter choke. Still another object of the present invention is to provide an improved process and apparatus for the production of carbon black in which the product uniformity is substantially improved. A further object of the present invention is to provide an improved process and apparatus for the production of carbon black in which the reaction time is maintained substantially constant for all increments of feed stock. Another object of the present invention is to provide an improved process and apparatus for the production of carbon black wherein the reaction temperature is maintained substantially constant throughout the reaction zone. Yet another object of the present invention is to provide an improved process and apparatus for the production of carbon black wherein hot spots and local thermal shock are essentially eliminated throughout the reaction zone. A still further object of the present invention is to provide an improved process and apparatus for the production of carbon black which permits the use of low-temperature construction materials for the reactor lining. Another object of the present invention is to provide an improved process and apparatus for the production of carbon black which permits the use of reactors having steel inner linings. A still further object of the present invention is to provide an improved process and apparatus for the production of carbon black by the furnace process in which a curtain of cooling fluid is maintained along essentially the entire length of the inner walls of the reaction zone. Another and further object of the present invention is to provide an improved process and apparatus for the production of carbon black in a reactor having the combustion zone and the reaction zone separated by a restricted-diameter choke, in which the reaction mixture adjacent the juncture of the choke and the reaction zone walls is quenched with a quenching fluid. A still further object of the present invention is to provide an improved process and apparatus for the production of carbon black in a tunnel-type furnace wherein progressively larger volumes of quench fluid are introduced from the influent end to the efflux end of the reaction zone. Another object of the present invention is to provide an improved process and apparatus for the production of carbon black in a tunnel-type furnace wherein a cooling fluid is introduced at spaced points along the length of the reaction zone and at progressively increasing angles with respect to the walls of the reaction zone. These and other objects and advantages of the present invention will be apparent from the following description when read in conjunction with the drawings, wherein:

Figure 1:
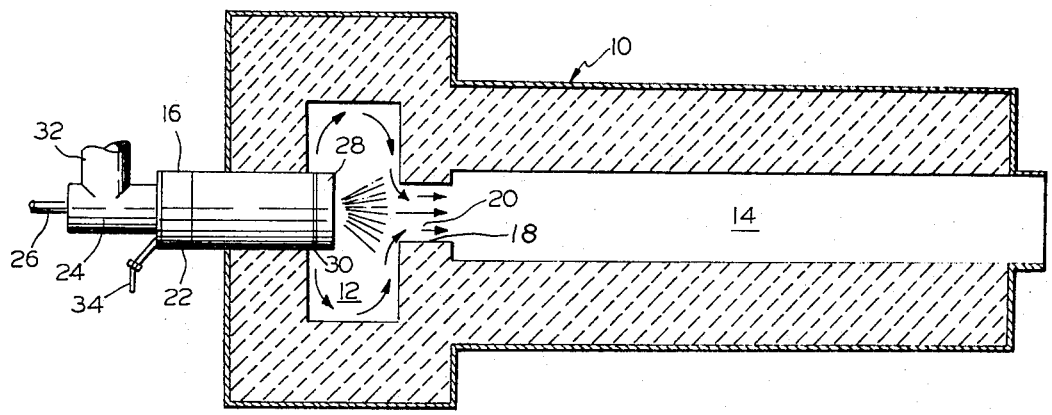
FIG. 1 is a cross-sectional, overall view of a prior art reactor of a type used in accordance with the present invention.

Briefly, it has been found, in accordance with the present invention, that the operation of a tunnel-type reactor and the quality of the carbon black produced therein can be substantially improved by introducing progressively increasing quantities of a quench fluid into the reaction mixture as it passes from the influent end to the effluent end of the reaction zone of the furnace. It has also been found that the operation of a tunnel-type carbon black furnace, having a restricted-diameter choke separating its combustion zone from its reaction zone, and the product produced therein can be improved by introducing a quench fluid into the reaction zone in the region adjacent the juncture between the restricted-diameter choke and the walls of the reaction zone. Finally, it has been found that the operation of a tunnel-type carbon black furnace and the product produced therein may be substantially improved by spraying a quench fluid into the reaction zone of the furnace at a plurality of points spaced from the influent end toward the effluent end of the reaction zone at any fourth or first quadrant angle, but, preferably, each successive spray pattern of quench fluid forms a first quadrant angle greater with respect to the walls of the reaction zone than the previously introduced spray pattern.

For a more complete understanding of the method and apparatus of the present invention, reference will first be made to FIG. 1 of the drawings, which illustrates the overall structure of the preferred type of carbon black reactor which is utilized in accordance with the present invention. Specifically, the numeral 10 designates a generally tubular reactor divided into a first combustion chamber or zone 12 and a second reactor chamber or zone 14. As illustrated, the first zone 12 is of greater diameter and shorter length than the second zone 14.

For optimum results, moreover, it is preferred that the diameter of the zone 12 be greater than its axial length and that the length of zone 14 be substantially greater than its diameter, although this is not a necessary limitation for the practice of the present invention.

The first zone 12 is provided with an inlet opening through which an injector assembly 16 projects while the zone 14 is provided with an outlet opening for withdrawal of reaction products. Positioned in the inlet end of zone 14 and actually dividing zone 12 from zone 14 is a replaceable, restricted-diameter choke ring 18 of a high-temperature refractory material having an orifice 20, the length, diameter and overall shape of which may vary. Each of the zones and their inlet and outlet openings is formed by a high-temperature refractory liner backed up by a castable refractory insulation, the entire reactor, in turn, having an outer steel shell or casing.

Injector assembly 16 is composed of substantially concentric tubular members 22, 24, and 26, respectively. Tubular members 22, 24, and 26 form corresponding passageways not shown. Fixedly attached to the end of member 24 is a deflector 28 having a diameter substantially equivalent to the of member 22. The position of deflector 28 within the zone 12 may be adjusted, by means not shown, so as to provide a circumferential orifice 30 of desired width, the orifice being formed by the deflector and the end of member 22. Air is introduced to the annular space between conduits 24 and 26 through conduit 32 while fuel is introduced to the annular space between conduits 22 and 24 through conduit 34. Conduit 26 carries a hydrocarbon feed stock and is provided at its inner, terminal end with a nozzle or injector (not shown), to inject the feed stock into zone 12 from the center of distributor plate 28. Conduit 32, in turn, is connected to a source of oxygen-bearing, combustion-supporting gas which serves to support, in part, the combustion of the fuel and/or feed stock. The process air or combustion-supporting gas for supporting combustion of fuel in zone 12 is discharged through appropriate openings into the circumferential orifice 30. Appropriate fuel, from an external source, passes through conduit 34 and is likewise distributed into the orifice 30. In operation, the process air and simultaneously injected hydrocarbon fuel are rapidly and thoroughly mixed in orifice 30. The resultant fuel-air mixture is ignited as it passes into zone 12, the burning mixture and its products of combustion flowing radially outwardly from the axis of zone 12 as a uniformly expanding disc-shaped stream. It then follows a flow pattern as determined by the configuration of chamber 12 and as shown generally by the arrows in the drawing, flowing substantially parallel to the circumferential surface of the zone towards the opposite end thereof where it is directed radially outwards towards the axis of the zone and through orifice 20. As hydrocarbon fuel and process air are introduced into the reactor, as just described, hydrocarbon feed stock is injected into zone 12 through the injector nozzle in the form of a vapor or atomized spray cone. The temperature of the feed stock is rapidly raised as it approaches orifice 18 and it is thoroughly mixed with and dispersed in the hot combustion gases resulting from the burning of the hydrocarbon fuel. The resultant mixture of combustion products and feed stock passes through the orifice 20 into zone 14, cracking of the feed stock being terminated in zone 14 by quenching with a suitable cooling medium as hereinafter pointed out. The cooled reaction gas with entrained carbon black then exits from zone 14 for subsequent separation and collection of the carbon black.

Figure 2:
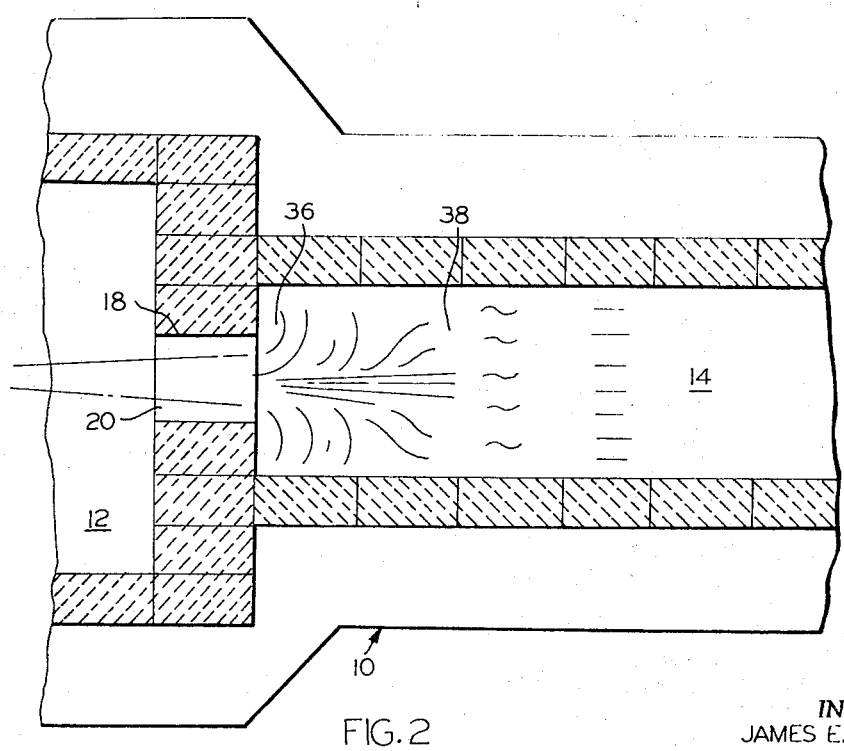
FIG. 2 is an enlarged cross-sectional view, partially in section, of the reactor of FIG. 1 showing the general flow patterns of fluids through the reactor.

While it is not intended that the present invention should be restricted to any particular theory of operation, it is believed that the nature of the present invention will be better understood and one skilled in the art will be aided in optimal operation as well as in the modification and variation of the present invention by reference to FIG. 2 of the drawings, which shows the flow characteristics of the materials through a reactor of the type illustrated in FIG. 1. Specifically, studies of the flow characteristics of the reactor in question indicate that the bulk of the feed stock entering the inlet end of choke 18 enters the reactor restriction essentially undisturbed. However, immediately adjacent the exit end of choke ring 18 and adjacent the walls of zone 14 of the reactor, an area of turbulence is created causing distribution of feed stock-carbon black across the tunnel. Some of the entering material is swept through a region of highest temperature and in a reverse circulatory motion, as shown by the region designated 36 in FIG. 2. The remainder of the feed stock-carbon black, comprising at least about half of the material, is carried down the axis of the tunnel as the feed stock to carbon black reaction proceeds. Ultimately, as the materials reach the region designated generally as 38 in FIG. 2, the distribution of carbon black and gases becomes nearly homogeneous. This homogeneous flow then continues down the tunnel or zone 14 until the conventional point of quenching is reached.

Thus, several observations concerning the feed stock to carbon black reaction can be arrived at based on the patterns shown in FIG. 2. First, the region of highest temperature in the reactor is an area described by a cone with its apex adjacent the entrance of choke ring 18 through region 36 to region 38, which forms the base of the cone. The carbon black feed stock and combustion products following the turbulent path shown in region 36, that following the semiturbulent path between region 36 and region 38, and that passing through region 38 are all subject to different reaction and temperature dynamics. For example, carbon black produced in region 36 will obviously have significantly different properties than carbon black produced in region 38. In other words, some of the carbon black, such as that produced at region 36, will be subjected to a progressively decreasing temperature profile but a longer reaction time as compared with that which passes directly into region 38 without entering region 36. It is believed that these differences in the reaction conditions to which the feed stocks and product carbon black are exposed lead to the previously mentioned differences in the properties of the individual increments of the ultimate carbon black product. Consequently, control or equalization of the conditions to which the reactants and products are subjected in passing through zone 14 will substantially improve the ultimate quality and decrease the range of properties of the carbon black product produced in the process, as well as permit extension of reactor life and convenience in switching from one type of carbon black to another in the same reactor system.

Figure 3:
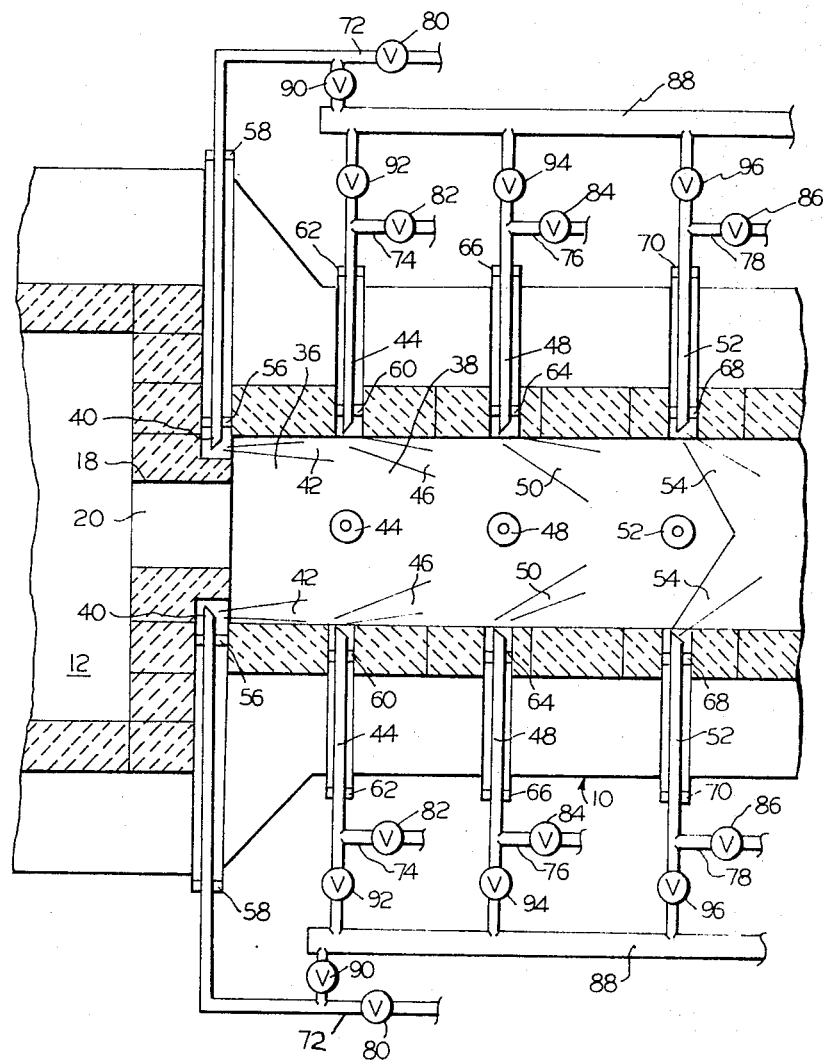
FIG. 3 is also an enlarged sectional view of a reactor in accordance with the present invention.

With the above flow patterns in mind, reference will now be made to FIG. 3 of the drawings which illustrates the same section of a reactor as the type shown in FIG. 2 and incorporates the invention of the present application. As shown in FIG. 3 of the drawings, the reactor is steel rather than refractory lined. An array of steam jets 40 is arranged around the tunnel side of choke ring 18 delivering a small amount of low-pressure steam or other appropriate cooling fluid in a generally annular pattern 42, along the walls of the tunnel 14. A second array of jets 44 provides additional quench further down tunnel 14, in a larger amount than the previous array and at a larger angle with respect to the walls of tunnel 14, thus providing a generally annular pattern 46. Still further down the path through tunnel 14, a third array of jets 48 introduces a still greater volume of quench fluid to tunnel 14 at a still greater angle with respect to the walls of tunnel 14, thus forming generally annular spray path 50. Finally, an array of jets 52 introduces a still greater quantity of quench fluid at a still larger angle with respect to the walls of tunnel 14 and as illustrated by the general spray pattern 54. As a general proposition, the array 52 will be located at approximately the same point in tunnel 14 that a single quench array would normally be located in the reactor. Thus, it is to be seen that as a result of the progressive quench of the present invention, substantially all of the feed stock and the carbon black products are subjected to essentially the same temperatures for substantially the same times so that no measurable differences in environmental conditions exist. Jet arrays 40, 44, 48 and 52 are, of course, provided with appropriately designed nozzles at their inner terminal ends to provide the proper spray pattern and angle. The spray jets 40, 44, 48 and 52 preferably pass outwardly through the reactor shell through appropriate packing glands 56–58, 60–62, 64–66, and 68–70, respectively, and are removable so that they may be readily replaced or unplugged, as necessary for convenient continuous operation, and/or switching from one type of carbon black manufacture to another. It is also preferred, primarily because of the desire to progressively increase the volume of steam or other quench fluid as one progresses toward the exit end of tunnel 14, that steam or other quenching fluid be supplied from an external source, not shown, through individual feedlines and valves 72, 74, 76 and 78, and 80, 82, 84 and 86, respectively. Alternatively, steam may be supplied to jets 40, 44, 48 and 52 from a common header 88 and the volume of steam controlled by valves 90, 92, 94 and 96, respectively.

Having described and illustrated the present invention by reference to specific examples, it is to be understood that such are not to be considered limiting but the present invention is to be limited only in accordance with the appended claims.

I claim:

1. A method for producing carbon black from a hydrocarbon feed stock, comprising, passing a mixture of said feed stock and a hot flue gas from the influent end to the effluent end of a generally tubular reaction zone at a velocity and under conditions such that said feed stock is converted to carbon black, and simultaneously with the passage of said mixture through said reaction zone quenching said mixture with low-pressure steam in amounts which progressively increase at each of a plurality of points successively spaced from the influent end toward the effluent end of said reaction to rapidly cool said mixture.

2. A method in accordance with claim 1 wherein the hydrocarbon feed stock is a liquid hydrocarbon feed stock.

3. A method in accordance with claim 1 wherein the flue gas is produced by the combustion of a mixture of natural gas and air.

4. A method for producing carbon black from a hydrocarbon feed stock, comprising, passing a mixture of said feed stock and a hot flue gas from the influent end to the effluent end of a generally tubular reaction zone at a velocity and under conditions such that said feed stock is converted to carbon black, and, simultaneously with the passage of said mixture through said reaction zone, injecting a quenching fluid into said mixture from the walls of said reaction zone within a single quadrant angle with respect of said walls of said reaction zone, which angle is progressively greater at each of a plurality of points successively spaced from the influent end toward the effluent end of said reaction zone and in amounts which progressively increase at each of said plurality of successive points from the influent end toward the effluent end of said reaction zone to rapidly cool said mixture.

5. A method in accordance with claim 4 wherein the quench fluid is introduced in a manner to form a continuous annular curtain of quench fluid along the entire length of the walls of the reaction zone.

6. A method in accordance with claim 4 wherein the reaction zone has a restricted-diameter choke, having a diameter smaller than the diameter of said reaction zone, located immediately adjacent its influent end and a part of the quench fluid is introduced into said reaction zone adjacent the juncture of said choke and the walls of said reaction zone.

7. A method in accordance with claim 4 wherein the hydrocarbon feed stock is a liquid hydrocarbon feed stock.

8. A method in accordance with claim 4 wherein the flue gas is produced by the combustion of a mixture of natural gas and air.

9. A method in accordance with claim 4 wherein the quench fluid is a low-pressure steam.

10. In a carbon black reactor system having a generally tubular combustion zone, a generally tubular reaction zone having a substantially smaller diameter than said combustion zone and a substantially greater length than said combustion zone, and a restricted-diameter choke positioned between said combustion zone and said reaction zone, the improvement comprising, a plurality of quench fluid injection means mounted in said reaction zone at predetermined spaced points from the influent end of said reaction zone toward the effluent end of said reaction zone and means for progressively increasing the amounts of quench fluid introduced by each successive injection means from said influent end to said effluent end of said reaction zone, each successive one of said quench fluid injection means being adapted to spray quench fluid into said reaction zone from the walls of said reaction zone within a single quadrant angle with respect to said walls of said reaction zone, which angle is progressively greater at each of said successive quench fluid injection means from the influent end toward the effluent end of said reaction zone.

11. A system in accordance with claim 10 wherein at least one of the injection means is located adjacent the juncture between the choke and the walls of the reaction zone.